(12) United States Patent
Li et al.

(10) Patent No.: US 11,966,541 B2
(45) Date of Patent: Apr. 23, 2024

(54) COMPENSATION CIRCUIT, TOUCH SCREEN, AND ELECTRONIC DEVICE

(71) Applicant: HKC CORPORATION LIMITED, Shenzhen (CN)

(72) Inventors: Dehuai Li, Guangdong (CN); Huiqi Wang, Guangdong (CN); Changfu Liu, Guangdong (CN); Haijiang Yuan, Guangdong (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/076,549

(22) Filed: Dec. 7, 2022

(65) Prior Publication Data

US 2024/0036679 A1 Feb. 1, 2024

(30) Foreign Application Priority Data

Jul. 28, 2022 (CN) .......................... 202210900617.3

(51) Int. Cl.
*G06F 3/041* (2006.01)
*G02F 1/1333* (2006.01)
*G06F 3/044* (2006.01)

(52) U.S. Cl.
CPC ........ *G06F 3/0418* (2013.01); *G02F 1/13338* (2013.01); *G06F 3/044* (2013.01); *G02F 1/133308* (2013.01)

(58) Field of Classification Search
CPC .... G06F 3/0418; G06F 3/044; G02F 1/13338; G02F 1/133308
USPC ................................................. 345/173–174
See application file for complete search history.

(56) References Cited

U.S. PATENT DOCUMENTS

| 2013/0021283 A1* | 1/2013 | Nishimura | .......... G06F 3/04166 345/173 |
| 2014/0198087 A1* | 7/2014 | Knausz | ............... G06F 3/04184 345/212 |
| 2015/0035767 A1* | 2/2015 | Chen | ................... G06F 3/04186 345/173 |
| 2015/0309612 A1* | 10/2015 | Morein | ............... G06F 3/04164 345/174 |

(Continued)

FOREIGN PATENT DOCUMENTS

| CN | 102842280 A | 12/2012 | |
| CN | 104700768 A | * 6/2015 | ............... G09G 3/20 |
| CN | 104700768 A | 6/2015 | |

(Continued)

OTHER PUBLICATIONS

The first office action issued in corresponding CN application No. 202210900617.3 dated Feb. 11, 2023.

*Primary Examiner* — Kwin Xie (74) *Attorney, Agent, or Firm* — HAUPTMAN HAM, LLP (57) ABSTRACT

A compensation circuit, a touch screen, and an electronic device are provided in the disclosure. The compensation circuit includes a logic circuit, a selection circuit, and a switch circuit. The logic circuit is configured to obtain a first selection signal, a second selection signal, and a third selection signal according to an enable signal and a timing signal. The selection circuit is configured to obtain a first control signal according to the first selection signal, obtain a second control signal according to the second selection signal, and obtain a third control signal according to the third selection signal.

14 Claims, 6 Drawing Sheets

(56) References Cited

U.S. PATENT DOCUMENTS

2017/0344179 A1\* 11/2017 Kim ..................... G09G 3/3677
2018/0173342 A1\* 6/2018 Lee ......................... G06F 3/044

FOREIGN PATENT DOCUMENTS

| CN | 107369424 A | 11/2017 | | |
|----|----|----|----|----|
| CN | 208433206 U | 1/2019 | | |
| CN | 114518809 A | 5/2022 | | |
| WO | WO-2014042489 A2 \* | 3/2014 | ........... | G06F 3/0418 |

\* cited by examiner

COMPENSATION CIRCUIT, TOUCH SCREEN, AND ELECTRONIC DEVICE

CROSS-REFERENCE TO RELATED APPLICATIONS

This application claims priority under 35 U.S.C. § 119(a) to Chinese Patent Application No. 202210900617.3, filed Jul. 28, 2022, the entire disclosure of which is incorporated herein by reference.

TECHNICAL FIELD

This disclosure relates to the field of touch display technology, and in particular, to a compensation circuit, a touch screen, and an electronic device.

BACKGROUND

As an input electronic device for human-computer interaction, a touch screen gradually replaces a keyboard and a mouse to become an important part of an electronic product. A projected mutual capacitive touch screen has advantages of realizing multi-touch and strong anti-interference ability. However, the projected mutual capacitive technology currently has a major problem of power supply common-mode interference, that is, noises such as chargers and finger tremors have influence on sensitivity of the touch screen.

SUMMARY

In a first aspect, a compensation circuit is provided. The compensation circuit is applicable to a touch screen and includes a logic circuit, a selection circuit, and a switch circuit. The logic circuit is configured to obtain a first selection signal, a second selection signal, and a third selection signal according to an enable signal and a timing signal. The selection circuit is configured to obtain a first control signal, a second control signal, and a third control signal according to the first selection signal, the second selection signal, and the third selection signal. The switch circuit is configured to be switched on in response to the first control signal to transmit a common voltage signal to a common electrode of the touch screen, be switched on in response to the second control signal to transmit a first compensation voltage signal to the common electrode, and be switched on in response to the third control signal to transmit a second compensation voltage signal to the common electrode.

In a second aspect, a touch screen is further provided. The touch screen has an active area and an inactive area surrounding the active area and includes the compensation circuit in the first aspect. The compensation circuit is disposed corresponding to the inactive area.

In a third aspect, an electronic device is further provided. The electronic device includes a housing and the touch screen in a second aspect. The housing is configured to carry the touch screen.

BRIEF DESCRIPTION OF THE DRAWINGS

To describe the technical solutions in the embodiments of the disclosure more clearly, the following briefly introduces the accompanying drawings required for describing the embodiments. Apparently, the accompanying drawings in the following description illustrate some embodiments of the disclosure. Those of ordinary skill in the art may also obtain other drawings based on these accompanying drawings without creative efforts.

References numbers are described as follows:

timing signal—T; output signal—TP; drive signal—OE1; angle-cutting signal—OE2; enable signal—EN; common voltage signal—VCOM; first compensation voltage signal—VCOM_H; second compensation voltage signal—VCOM_L; compensation circuit—1; logic circuit—11; first processing module—111; first inverter circuit—1111; first AND gate circuit—1112; second processing module—112; second inverter circuit—1121; third processing module—113; third inverter circuit—1131; second AND gate circuit—1132; third AND gate circuit—1133; OR gate circuit—1134; selection circuit—12; switch circuit—13; first switch unit—131; second switch unit—132; third switch unit—133; touch screen—2; common electrode—21; pixel electrode—22; touch electrode—23; liquid crystal capacitor—24; coupling capacitor—25; active area—26; inactive area—27; electronic device—3; housing—31.

DETAILED DESCRIPTION

The technical solutions in the embodiments of the disclosure are clearly and completely described in the following with reference to the accompanying drawings in the embodiments of the disclosure. Apparently, the described embodiments are merely a part of rather than all the embodiments of the disclosure. All other embodiments obtained by those of ordinary skill in the art based on the embodiments of the disclosure without creative efforts are within the scope of the disclosure.

Figure 1:
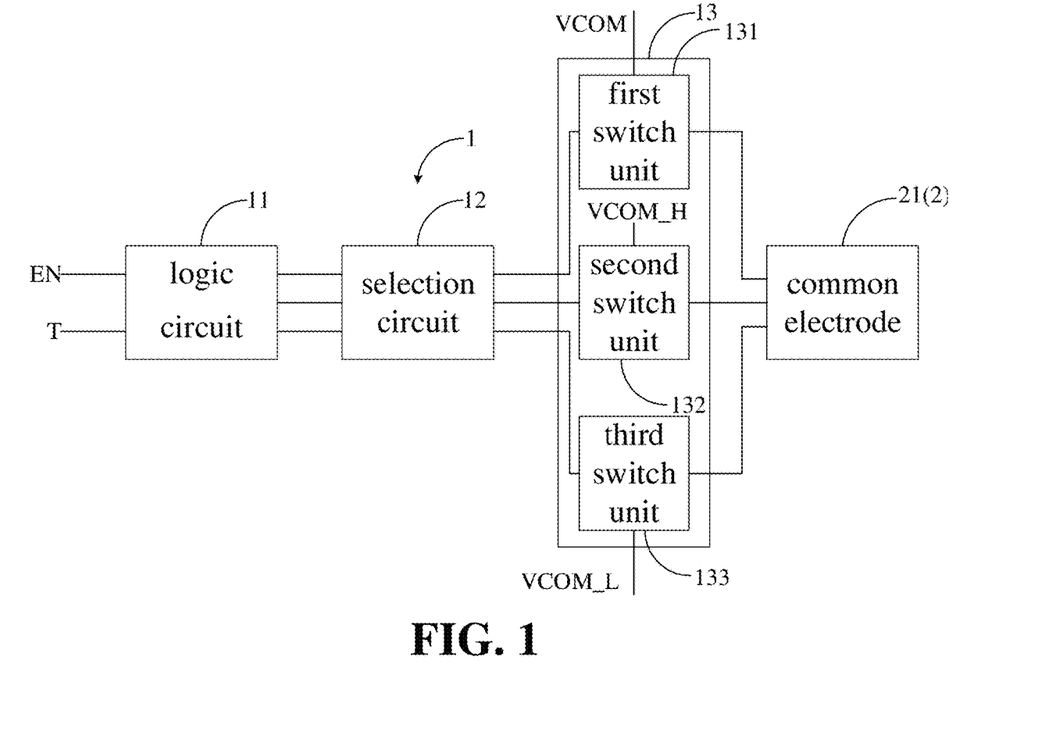
FIG. 1 is a schematic diagram of a compensation circuit provided in an embodiment of the disclosure.

A compensation circuit 1 is provided in the disclosure. The compensation circuit 1 is applicable to a touch screen 2. Refer to FIG. 1, which is a schematic diagram of the compensation circuit provided in an embodiment of the disclosure. The compensation circuit 1 includes a logic circuit 11, a selection circuit 12, and a switch circuit 13. The logic circuit 11 is configured to obtain a first selection signal, a second selection signal, and a third selection signal according to an enable signal EN and a timing signal T. The selection circuit 12 is configured to obtain a first control signal, a second control signal, and a third control signal according to the first selection signal, the second selection signal, and the third selection signal. The switch circuit 13 is configured to be switched on in response to the first control signal to transmit a common voltage signal VCOM to a common electrode 21 of the touch screen 2, be switched on in response to the second control signal to transmit a first compensation voltage signal VCOM_H to the common electrode 21, and be switched on in response to the third control signal to transmit a second compensation voltage signal VCOM_L to the common electrode 21.

The compensation circuit 1 is provided in the disclosure, which can eliminate influence of noises such as chargers and finger tremors on sensitivity of a touch screen, thereby realizing a touch track with good smoothness.

Figure 2:
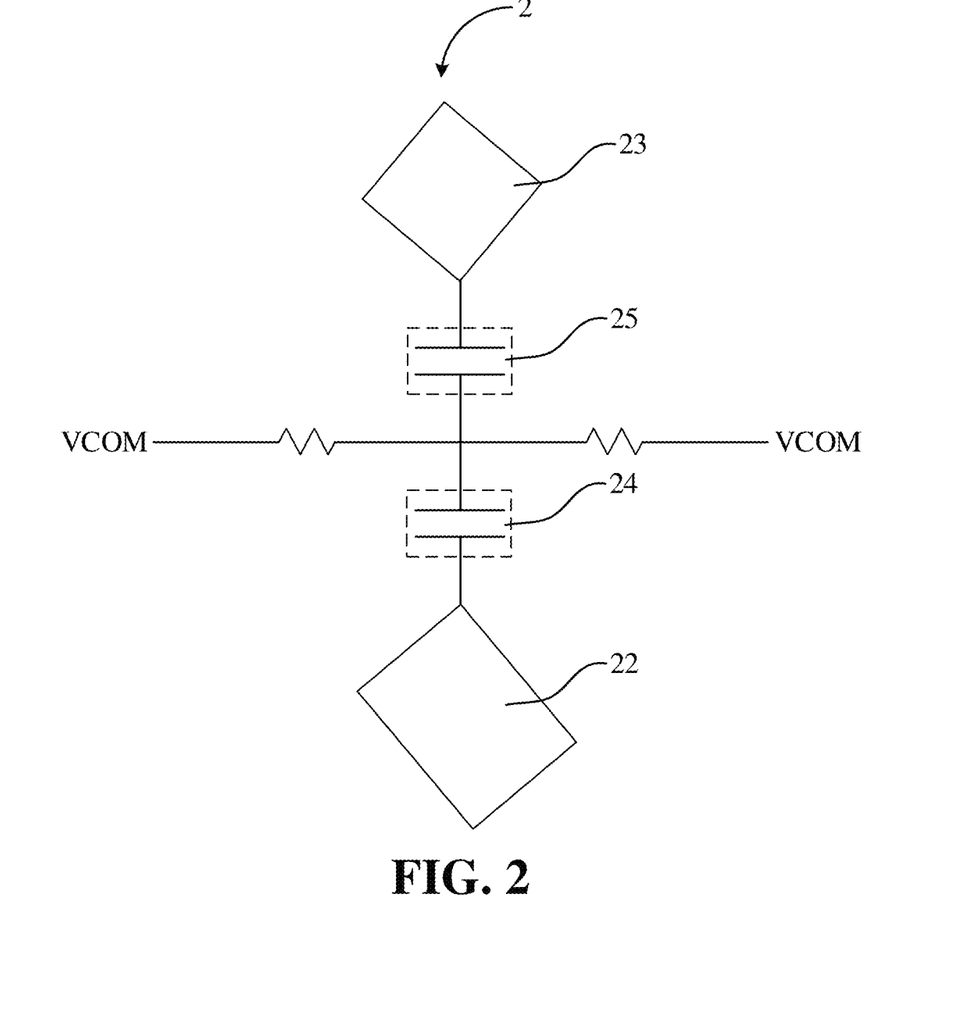
FIG. 2 is a schematic circuit diagram of a touch screen provided in an embodiment of the disclosure.

It is noted that, in this embodiment, for example, the touch screen 2 is a liquid crystal display (LCD). Refer to FIG. 2, which is a schematic circuit diagram of the touch screen provided in an embodiment of the disclosure. Specifically, the touch screen 2 further includes a pixel electrode 22 and a touch electrode 23. A liquid crystal capacitor 24 is disposed between the pixel electrode 22 and the common electrode 21. A liquid crystal layer (not illustrated in FIG. 2) is also disposed between the pixel electrode 22 and the common electrode 21. A voltage difference between the common electrode 21 and the pixel electrode 22 can be varied by changing a voltage of the pixel electrode 22, so that the liquid crystal layer is varied in molecular alignment under different electric fields, thereby changing a light transmittance of the liquid crystal layer and eventually realizing image display.

Figure 3:
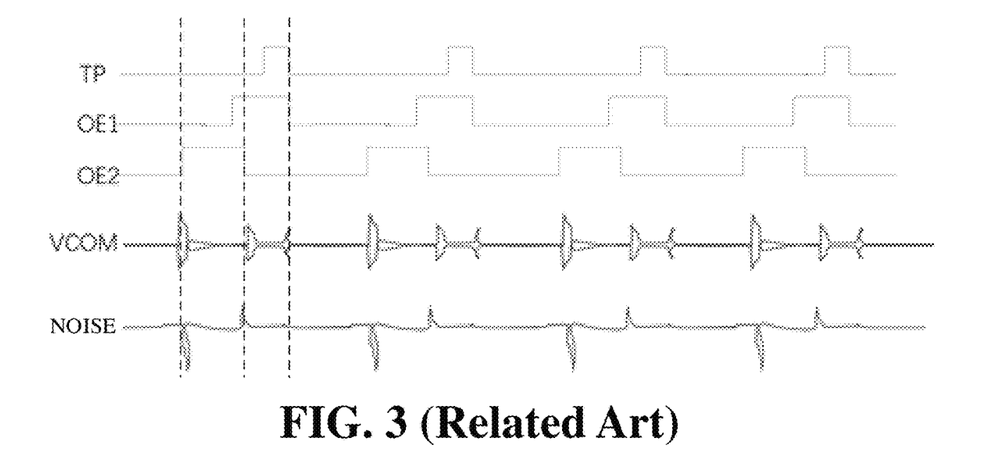
FIG. 3 is a schematic diagram of signal waveforms in the related art.

A coupling capacitor 25 is disposed between the touch electrode 23 and the common electrode 21. In the related art, a power supply directly outputs the common voltage signal VCOM to the common electrode 21, and the timing signal T used for displaying of the touch screen 2 may suffer from interference of noises such as finger tremors, thus a waveform of the common voltage signal VCOM transmitted on the common electrode 21 will be affected. Refer to FIG. 3, which is a schematic diagram of signal waveforms in the related art. Specifically, the timing signal T may be any one or more of an output signal TP, a drive signal OE1, and an angle-cutting signal OE2. In an example, the output signal TP is configured to control a drive circuit of the touch screen 2 to output display image data to pixels in the active area 26. The drive signal OE1 is configured to control output of multiple scan lines of the touch screen 2. The angle-cutting signal OE2 is a voltage signal for controlling multiple gray levels.

As illustrated in FIG. 3, the noise interference in the touch screen 2 can be in one-to-one correspondence with waveform of the timing signal T. Each timing signal T has a certain influence on a waveform of the common voltage signal VCOM and is coupled to the touch electrode 23, thus affecting a touch sensing of the touch screen 2.

Specifically, the noise interference in the touch screen 2 can be in one-to-one correspondence with waveform of the timing signal T. With aid of the enable signal EN added, the logic circuit 11 can obtain the first selection signal, the second selection signal, and the third selection signal according to the timing signal T and the enable signal EN under different circumstances. It can be understood that, three kinds of output can be realized accordingly, that is, the common voltage signal VCOM is transmitted to the common electrode 21, the first compensation voltage signal VCOM_H is transmitted to the common electrode 21, and the second compensation voltage signal VCOM_L is transmitted to the common electrode 21.

In this embodiment, the selection circuit 12 is a digital-to-analog converter (DAC), which can convert digital signals in the circuit into analog signals, such that the first control signal can be obtained by converting the first selection signal, the second control signal can be obtained by converting the second selection signal, and the third control signal can be obtained by converting the third selection signal. The switch circuit 13 includes multiple transistors, where different transistors are switched on by loading the first control signal, the second control signal, and the third control signal, respectively, such that the common voltage signal VCOM, the first compensation voltage signal VCOM_H, and the second compensation voltage signal VCOM_L can be respectively transmitted to the common electrode 21 through the switch circuit 13.

It is noted that, in this embodiment, the noise interference in the touch screen 2 can be directly corresponding to a waveform of the timing signal T, and the first compensation voltage signal VCOM_H or the second compensation voltage signal VCOM_L which is in real time in reverse phase with the noise interference can be generated by processing the enable signal EN and the timing signal T, whereby compensating the common electrode 21, eliminating or reducing the noise interference in the touch screen 2, and realizing a touch track with good smoothness.

In an embodiment, refer to FIG. 1, the switch circuit 13 includes a first switch unit 131, a second switch unit 132, and a third switch unit 133. The first switch unit 131 is configured to be switched on under control of the first control signal to transmit the common voltage signal VCOM to the common electrode 21. The second switch unit 132 is configured to be switched on under control of the second control signal to transmit the first compensation voltage signal VCOM_H to the common electrode 21. The third switch unit 133 is configured to be switched on under control of the third control signal to transmit the second compensation voltage signal VCOM_L to the common electrode 21. When any one of the first switch unit 131 corresponding to the first control signal, the second switch unit 132 corresponding to the second control signal, and the third switch unit 133 corresponding to the third control signal is switched on, the other two are switched off.

Specifically, in order to avoid adversely affecting display and touch functions of the touch screen 2 due to chaotic waveforms of signals transmitted on the common electrode 21 caused by that no voltage signal is transmitted to the common electrode 21 at a certain time or that multiple voltage signals are simultaneously transmitted to the common electrode 21, when the switch circuit 13 switches on any one of the switch unit corresponding to the first control signal, the switch unit corresponding to the second control signal, and the switch unit corresponding to the third control signal, the switch circuit 13 switches off the other two switch units according to the other two signals.

For example, when the second switch unit 132 is switched on under the control of the second control signal, the first compensation voltage signal VCOM_H is transmitted to the common electrode 21, and meanwhile, the first switch unit 131 is switched off under the control of the first control signal, and the third switch unit 133 is switched off under the control of the third control signal, such that the common voltage signal VCOM and the second compensation voltage signal VCOM_L can be prevented from being transmitted to the common electrode 21.

In this embodiment, the first switch unit 131, the second switch unit 132, and the third switch unit 133 may all be transistors. When any one of the first control signal, the second control signal, and the third control signal is a high-level signal, in the switch circuit 13 a transistor whose corresponding control signal is the high-level signal is switched on. In other words, in the switch circuit 13, when any one of the first control signal, the second control signal, or the third control signal is a high-level signal, the other two are low-level signals. A voltage value of the high-level signal is in a voltage range different from a voltage range a voltage value of the low-level signal is in, and the voltage range of the high-level signal is different from that of the low-level signal according to actual circuits.

It can be understood that, in other embodiments, when any one of the first control signal, the second control signal, and the third control signal is a low-level signal, in the switch circuit 13 a transistor whose corresponding control signal is the low-level signal is switched on. A manner of switching the transistors of the switch circuit 13 on depends on types of the transistors of the switch circuit 13, as long as it does not affect that when the switch circuit 13 switches on a corresponding path according to any one of the first control signal, the second control signal, or the third control signal, the switch circuit 13 switches off the rest paths according to the other two signals, which is not limited herein.

Figure 4:
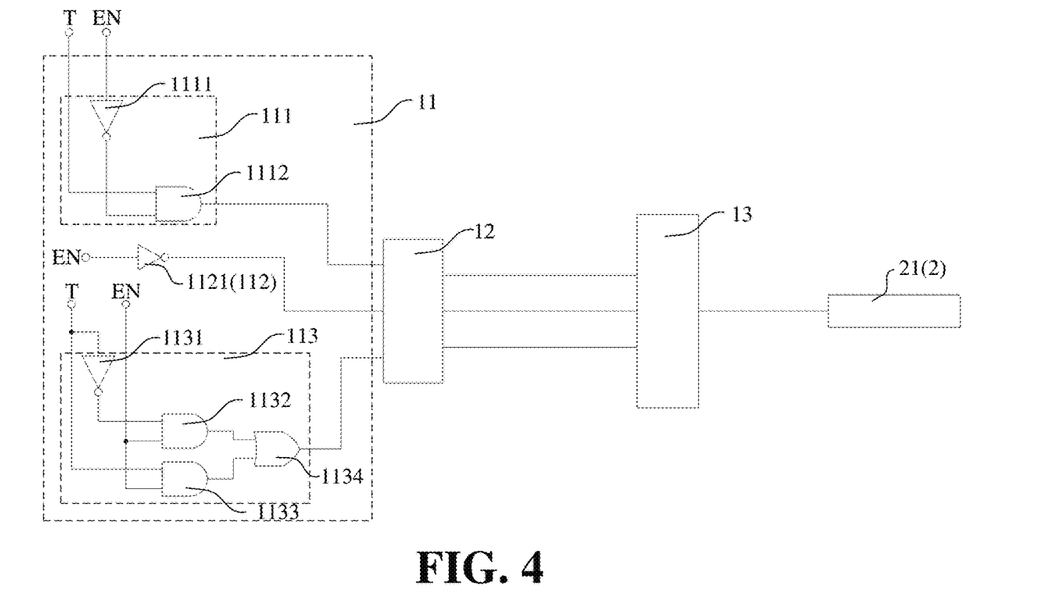
FIG. 4 is a schematic diagram of a logic circuit provided in an embodiment of the disclosure.

In an embodiment, refer to FIG. 4, which is a schematic diagram of a logic circuit provided in an embodiment of the disclosure. The logic circuit 11 includes a first processing module 111. The first processing module 111 includes a first inverter circuit 1111 and a first AND gate circuit 1112. The first inverter circuit 1111 has an input terminal configured to receive the enable signal EN and an output terminal electrically coupled with a first terminal of the first AND gate circuit 1112. The first AND gate circuit 1112 has a second terminal configured to receive the timing signal T and an output terminal configured to output the first selection signal to the selection circuit 12.

Specifically, the first inverter circuit 1111 is configured to invert a phase of a signal received at the input terminal of the first inverter circuit 1111, and to output the signal phase-inverted at the output terminal of the first inverter circuit 1111. For example, if the enable signal EN received at the input terminal of the first inverter circuit 1111 is a high-level signal, then a low-level signal is outputted at the output terminal of the first inverter circuit 1111, and vice versa. If a signal received at the first terminal of the first AND gate circuit 1112 and a signal received at the second terminal of the first AND gate circuit 1112 are both high-level signals, a high-level signal is outputted at the output terminal of the first AND gate circuit 1112; otherwise, a low-level signal is outputted at the output terminal of the first AND gate circuit 1112.

In an embodiment, refer to FIG. 4 again, the logic circuit 11 includes a second processing module 112. The second processing module 112 includes a second inverter circuit 1121. The second inverter circuit 1121 has an input terminal configured to receive the enable signal EN and an output terminal configured to output the second selection signal to the selection circuit 12. Similarly, the second inverter circuit 1121 is configured to invert a phase of a signal received at the input terminal of the second inverter circuit 1121, and to output the signal phase-inverted at the output terminal of the second inverter circuit 1121.

In an embodiment, refer to FIG. 4 again, the logic circuit 11 includes a third processing module 113. The third processing module 113 includes a third inverter circuit 1131, a second AND gate circuit 1132, a third AND gate circuit 1133, and an OR gate circuit 1134. The third inverter circuit 1131 has an input terminal configured to receive the timing signal T and an output terminal electrically coupled with a second terminal of the second AND gate circuit. The second AND gate circuit has a first terminal configured to receive the enable signal EN. The third AND gate circuit has a first terminal configured to receive the enable signal EN and a second terminal configured to receive the timing signal T. The OR gate circuit 1134 has a first terminal electrically coupled with an output terminal of the second AND gate circuit, a second terminal electrically coupled with an output terminal of the third AND gate circuit, and an output terminal configured to output the third selection signal to the selection circuit 12.

Similarly, the third inverter circuit 1131 is configured to invert a signal received at the input terminal of the third inverter circuit 1131, and to output the signal phase-inverted at the output terminal of the third inverter circuit 1131. When a signal received at the first terminal of the second AND gate circuit 1132 and a signal received at the second terminal of the second AND gate circuit 1132 are both high-level signals, a high-level signal is outputted at the output terminal of the second AND gate circuit 1132; otherwise, a low-level signal is outputted at the output terminal of the second AND gate circuit 1132. When a signal received at the first terminal of the third AND gate circuit 1133 and a signal received at the second terminal of the third AND gate circuit 1133 are both high-level signals, a high-level signal is outputted at the output terminal of the third AND gate circuit 1133; otherwise, a low-level signal is outputted at the output terminal of the third AND gate circuit 1133. Specifically, when a signal received at the first terminal or the second terminal of the OR gate circuit 1134 is a high-level signal, a high-level signal is outputted at the output terminal of the OR gate circuit 1134; otherwise, a low-level signal is outputted at the output terminal of the OR gate circuit 1134.

In this embodiment, the selection circuit 12 is configured to obtain the first control signal, the second control signal, or the third control signal to control the switch circuit 13 to be switched on, according to a combination of high level signals and low-level signals of the first selection signal, the second selection signal, and the third control signal.

Figure 5:
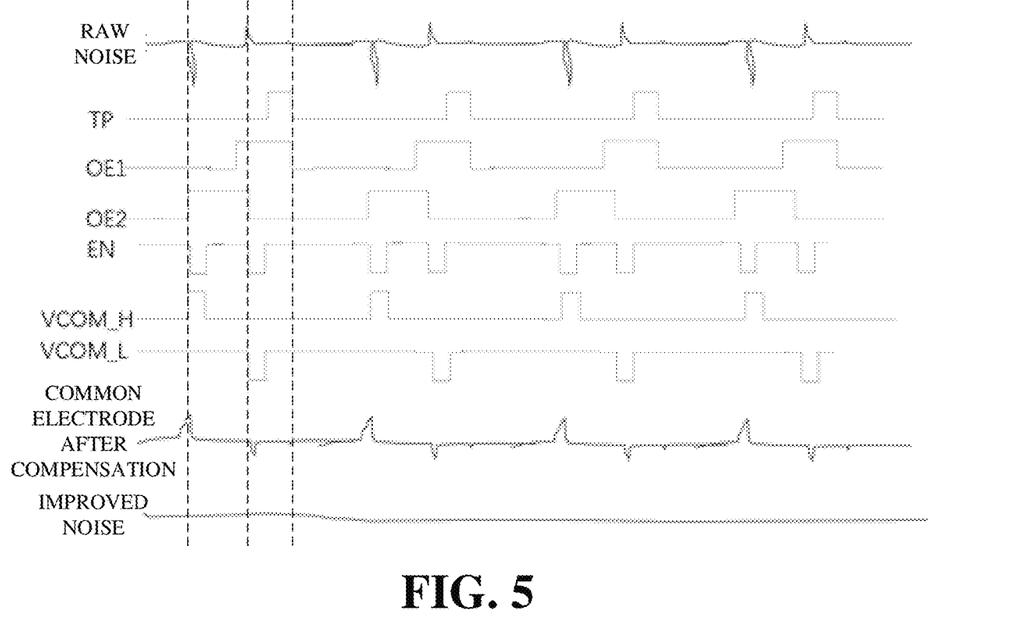
FIG. 5 is a schematic diagram of signal waveforms provided in an embodiment of the disclosure.

Specifically, refer to FIG. 5, which is a schematic diagram of signal waveforms provided in an embodiment of the disclosure. For example, when the timing signal T is the angle-cutting signal OE2, the enable signal EN is reduced from a high-level signal to a low-level signal at each rising edge of the angle-cutting signal OE2 and maintains at low-level for a period of time, and the selection circuit 12 rises the second control signal from a low-level signal to a high-level signal when the first selection signal is a high-level signal, the second selection signal is a high-level signal, and the third selection signal is a low-level signal; the enable signal EN is reduced from a high-level signal to a low-level signal at each falling edge of the angle-cutting signal OE2 and maintains at low-level for a period of time, and the selection circuit 12 rises the third control signal from a low-level signal to a high-level signal when the first selection signal is a low-level signal, the second selection signal is a high-level signal, and the third selection signal is a low-level signal. It can be understood that, when the second control signal and the third control signal are both low-level signals, the first control signal is a high-level signal.

In this embodiment, as illustrated in Table 1 below, a table of correspondence between various control signals and voltages of the common electrode 21 can be obtained in combination with FIG. 5, which will not be elaborated herein. In this embodiment, "1" represents a high-level signal, and "0" represents a low-level signal.

TABLE 1 correspondence between control signals and voltages of the common electrode

| OE2 | EN | First selection signal | Second selection signal | Third selection signal | First control signal | Second control signal | Third control signal | Voltage of common electrode |
|---|---|---|---|---|---|---|---|---|
| 1 | 1 | 0 | 0 | 1 | 1 | 0 | 0 | VCOM |
| 1 | 0 | 1 | 1 | 0 | 0 | 1 | 0 | VCOM_H |

TABLE 1-continued correspondence between control signals and voltages of the common electrode

| OE2 | EN | First selection signal | Second selection signal | Third selection signal | First control signal | Second control signal | Third control signal | Voltage of common electrode |
|---|---|---|---|---|---|---|---|---|
| 0 | 1 | 0 | 0 | 1 | 1 | 0 | 0 | VCOM |
| 0 | 0 | 0 | 1 | 0 | 0 | 0 | 1 | VCOM_L |

In an embodiment, the timing signal T is a gate shaping signal OE2 of the touch screen 2.

Specifically, as illustrated in FIG. 5, a noise waveform of the touch screen 2 is mainly affected by the angle-cutting signal OE2. The noise waveform will generate a low-voltage spike at each rising edge of the angle-cutting signal OE2 and a high-voltage spike at each falling edge of the angle-cutting signal OE2.

As s result, in this embodiment, the timing signal T is the angle-cutting signal OE2 of the touch screen 2. In combination with the enable signal EN, the logic circuit 11 processes the timing signal T and the enable signal EN to obtain the first selection signal, the second selection signal, and the third selection signal. Correspondingly, the common voltage signal VCOM is transmitted to the common electrode 21 according to the first selection signal, the first compensation voltage signal VCOM_H is transmitted to the common electrode 21 according to the second selection signal, and the second compensation voltage signal VCOM_L is transmitted to the common electrode 21, and thus, an improved noise waveform is illustrated in FIG. 5, and the noise interference can be significantly reduced or eliminated.

In an embodiment, refer to FIG. 5 again, the first compensation voltage signal VCOM_H has a greater voltage value than the common voltage signal VCOM. The second compensation voltage signal VCOM_L has a less voltage value than the common voltage signal VCOM.

In this embodiment, when the angle-cutting signal OE2 has a rising edge change and the noise waveform generates a low-voltage spike, the second control signal is a high-level signal, such that the first compensation voltage signal VCOM_H is transmitted to the common electrode 21. Thus, the voltage value of the first compensation voltage signal VCOM_H is greater than the voltage value of the common voltage signal VCOM, so that the low-voltage spike generated by the noise waveform can be offset or attenuated. When the angle-cutting signal OE2 has a falling edge change and the noise waveform generates a high-voltage peak, the third control signal is a high-level signal, such that the second compensation voltage signal VCOM_L is transmitted to the common electrode 21. As such, the voltage value of the second voltage compensation voltage signal VCOM_L is smaller than the voltage value of the common voltage signal VCOM, so that the high voltage spikes generated by the noise waveform can be offset or attenuated.

In an embodiment, the selection circuit 12 is configured to provide the common voltage signal VCOM, the first compensation voltage signal VCOM_H, and the second compensation voltage signal VCOM_L.

Specifically, different from the related art, the common voltage signal VCOM, the first compensation voltage signal VCOM_H, and the second compensation voltage signal VCOM_L are loaded into the common electrode 21 through the switch circuit 13. It is understood that, the common voltage signal VCOM, the first compensation voltage signal VCOM_H, and the second compensation voltage signal VCOM_L may be obtained from voltage divisions of the drive circuit of the touch screen 2, or may be converted and generated through the selection circuit 12.

It is understood that, in this embodiment, the selection circuit 12 is configured to provide the common voltage signal VCOM, the first compensation voltage signal VCOM_H, and the second compensation voltage signal VCOM_L, thereby reducing the number of electronic components of the compensation circuit 1 and reducing complexity of circuit design.

Figure 6:
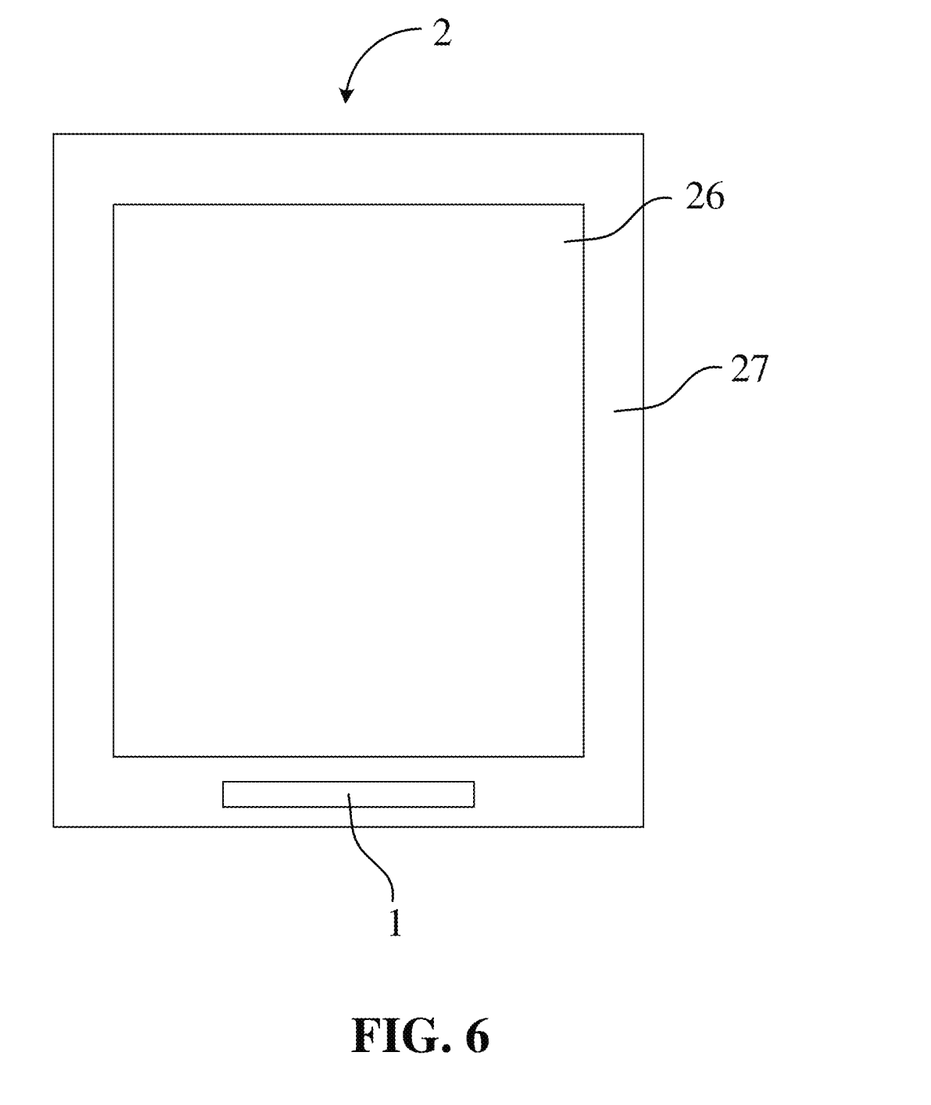
FIG. 6 is a schematic top view of a touch screen provided in an embodiment of the disclosure.

A touch screen 2 is further provided in the disclosure. Refer to FIG. 6, which is a schematic top view of a touch screen provided in an embodiment of the disclosure. The touch screen 2 has an active area 26 and an inactive area 27 surrounding the active area 26. The touch screen 2 includes the above-mentioned compensation circuit 1. The compensation circuit 1 is disposed corresponding to the inactive area 27. For the compensation circuit 1, reference can be made to above, which will not be repeated herein.

Specifically, the active area 26 is used for image display. The compensation circuit 1 is disposed in the inactive area 27 to avoid affecting image display of the touch screen 2 in the active area 26.

It is understood that, in this embodiment, the noise interference in the touch screen 2 can be directly corresponding to the waveform of the timing signal T of the touch screen 2, and the compensation circuit 1 can provide compensation for the common electrode 21 of the touch screen 2 according to the enable signal EN and the timing signal T, thereby eliminating or reducing the noise interference in the touch screen 2, and realizing a touch track with good smoothness.

Figure 7:
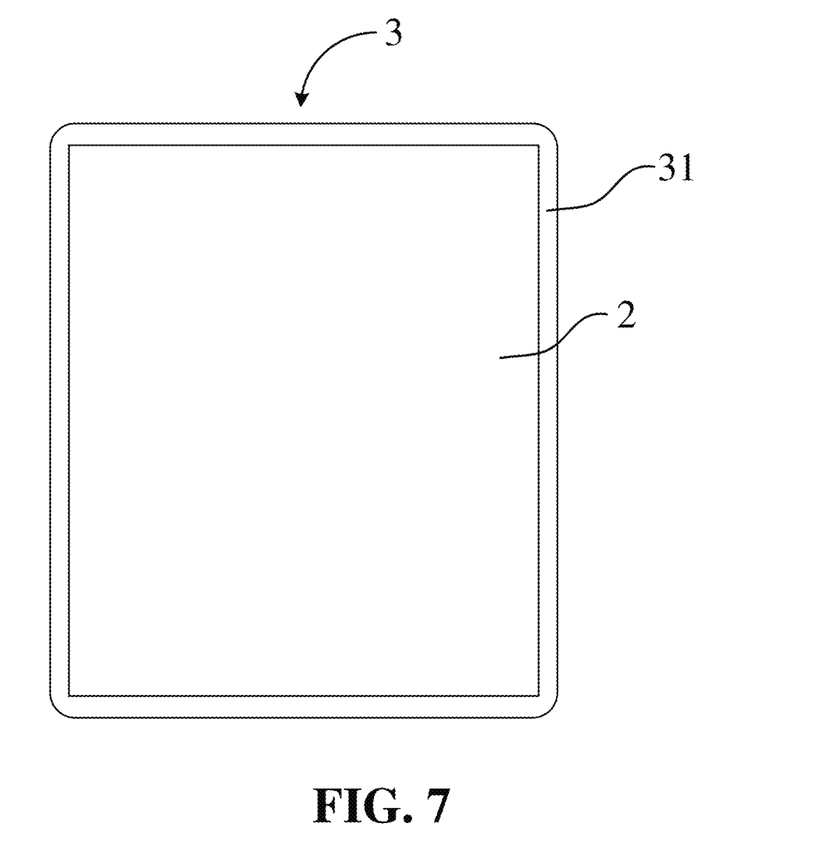
FIG. 7 is a schematic top view of an electronic device provided in an embodiment of the disclosure.

An electronic device 3 is further provided in the disclosure. Refer to FIG. 7, which is a schematic top view of an electronic device provided in an embodiment of the disclosure. The electronic device 3 includes a housing 31 and the above-mentioned touch screen 2. The housing 31 is configured to carry the touch screen 2. Specifically, for the touch screen 2, reference can be made to the above, which will not be repeated herein.

It is noted that the electronic device 3 in the embodiments of the disclosure can be a device such as a mobile phone, a smart phone, a tablet computer, an e-reader, a wearable portable device, and a notebook computer. The electronic device 3 can communicate with a data transfer server through the Internet, and the data transfer server may be an instant messaging server, an social networking services (SNS) server, etc., which is not limited by the embodiments of the disclosure.

Specific examples are used herein to describe the principle and embodiments of the disclosure. The description of the above embodiments is merely used to help understand the core idea of the disclosure. Meanwhile, those skilled in the art may make modifications to the embodiments and the application scope according to the idea of the disclosure. In summary, the contents of the specification should not be construed as limiting the disclosure.

What is claimed is:

1. A compensation circuit applicable to a touch screen and comprising a logic circuit, a selection circuit, and a switch circuit, wherein
the logic circuit is configured to obtain a first selection signal, a second selection signal, and a third selection signal according to an enable signal and a timing signal;
the selection circuit is configured to obtain a first control signal, a second control signal, and a third control signal according to the first selection signal, the second selection signal, and the third selection signal;
the switch circuit is configured to be switched on in response to the first control signal to transmit a common voltage signal to a common electrode of the touch screen, be switched on in response to the second control signal to transmit a first compensation voltage signal to the common electrode, and be switched on in response to the third control signal to transmit a second compensation voltage signal to the common electrode;
the switch circuit comprises a first switch unit, a second switch unit, and a third switch unit, wherein the first switch unit is configured to be switched on under control of the first control signal to transmit the common voltage signal to the common electrode, the second switch unit is configured to be switched on under control of the second control signal to transmit the first compensation voltage signal to the common electrode, and the third switch unit is configured to be switched on under control of the third control signal to transmit the second compensation voltage signal to the common electrode;
when any one of the first switch unit corresponding to the first control signal, the second switch unit corresponding to the second control signal, and the third switch unit corresponding to the third control signal is switched on, the other two are switched off; and
the logic circuit comprises a first processing module, wherein the first processing module comprises a first inverter circuit and a first AND gate circuit, and wherein the first inverter circuit has an input terminal configured to receive the enable signal and an output terminal electrically coupled with a first terminal of the first AND gate circuit, and the first AND gate circuit has a second terminal configured to receive the timing signal and an output terminal configured to output the first selection signal to the selection circuit.

2. The compensation circuit of claim 1, wherein the logic circuit comprises a second processing module, wherein the second processing module comprises a second inverter circuit, and wherein the second inverter circuit has an input terminal configured to receive the enable signal and an output terminal configured to output the second selection signal to the selection circuit.

3. The compensation circuit of claim 1, wherein the logic circuit comprises a further processing module, wherein the further processing module comprises a third inverter circuit, a second AND gate circuit, a third AND gate circuit, and an OR gate circuit, and wherein the third inverter circuit has an input terminal configured to receive the timing signal and an output terminal electrically coupled with a second terminal of the second AND gate circuit, the second AND gate circuit has a first terminal configured to receive the enable signal, the third AND gate circuit has a first terminal configured to receive the enable signal and a second terminal configured to receive the timing signal, and the OR gate circuit has a first terminal electrically coupled with an output terminal of the second AND gate circuit, a second terminal electrically coupled with an output terminal of the third AND gate circuit, and an output terminal configured to output the third selection signal to the selection circuit.

4. The compensation circuit of claim 1, wherein, the timing signal is a gate shaping signal of the touch screen.

5. The compensation circuit of claim 1, wherein the first compensation voltage signal has a greater voltage value than the common voltage signal, and the second compensation voltage signal has a less voltage value than the common voltage signal.

6. The compensation circuit of claim 1, wherein the selection circuit is configured to provide the common voltage signal, the first compensation voltage signal, and the second compensation voltage signal.

7. A touch screen having an active area and an inactive area surrounding the active area and comprising a compensation circuit, the compensation circuit being disposed corresponding to the inactive area and comprising a logic circuit, a selection circuit, and a switch circuit, wherein
the logic circuit is configured to obtain a first selection signal, a second selection signal, and a third selection signal according to an enable signal and a timing signal;
the selection circuit is configured to obtain a first control signal, a second control signal, and a third control signal according to the first selection signal, the second selection signal, and the third selection signal;
the switch circuit is configured to be switched on in response to the first control signal to transmit a common voltage signal to a common electrode of the touch screen, be switched on in response to the second control signal to transmit a first compensation voltage signal to the common electrode, and be switched on in response to the third control signal to transmit a second compensation voltage signal to the common electrode;
the switch circuit comprises a first switch unit, a second switch unit, and a third switch unit, wherein the first switch unit is configured to be switched on under control of the first control signal to transmit the common voltage signal to the common electrode, the second switch unit is configured to be switched on under control of the second control signal to transmit the first compensation voltage signal to the common electrode, and the third switch unit is configured to be switched on under control of the third control signal to transmit the second compensation voltage signal to the common electrode;
when any one of the first switch unit corresponding to the first control signal, the second switch unit corresponding to the second control signal, and the third switch unit corresponding to the third control signal is switched on, the other two are switched off; and
the logic circuit comprises a first processing module, wherein the first processing module comprises a first inverter circuit and a first AND gate circuit, and wherein the first inverter circuit has an input terminal configured to receive the enable signal and an output terminal electrically coupled with a first terminal of the first AND gate circuit, and the first AND gate circuit has a second terminal configured to receive the timing signal and an output terminal configured to output the first selection signal to the selection circuit.

8. The touch screen of claim 7, wherein the logic circuit comprises a second processing module, wherein the second processing module comprises a second inverter circuit, and wherein the second inverter circuit has an input terminal configured to receive the enable signal and an output terminal configured to output the second selection signal to the selection circuit.

9. The touch screen of claim 7, wherein the logic circuit comprises a further processing module, wherein the further processing module comprises a third inverter circuit, a second AND gate circuit, a third AND gate circuit, and an OR gate circuit, and wherein the third inverter circuit has an input terminal configured to receive the timing signal and an output terminal electrically coupled with a second terminal of the second AND gate circuit, the second AND gate circuit has a first terminal configured to receive the enable signal, the third AND gate circuit has a first terminal configured to receive the enable signal and a second terminal configured to receive the timing signal, and the OR gate circuit has a first terminal electrically coupled with an output terminal of the second AND gate circuit, a second terminal electrically coupled with an output terminal of the third AND gate circuit, and an output terminal configured to output the third selection signal to the selection circuit.

10. The touch screen of claim 7, wherein, the timing signal is a gate shaping signal of the touch screen.

11. The touch screen of claim 7, wherein the first compensation voltage signal has a greater voltage value than the common voltage signal, and the second compensation voltage signal has a less voltage value than the common voltage signal.

12. The touch screen of claim 7, wherein the selection circuit is configured to provide the common voltage signal, the first compensation voltage signal, and the second compensation voltage signal.

13. An electronic device comprising a housing and a touch screen which has an active area and an inactive area surrounding the active area and comprises a compensation circuit, the housing being configured to carry the touch screen, and the compensation circuit being disposed corresponding to the inactive area and comprising a logic circuit, a selection circuit, and a switch circuit, wherein the logic circuit is configured to obtain a first selection signal, a second selection signal, and a third selection signal according to an enable signal and a timing signal;

the selection circuit is configured to obtain a first control signal, a second control signal, and a third control signal according to the first selection signal, the second selection signal, and the third selection signal;

the switch circuit is configured to be switched on in response to the first control signal to transmit a common voltage signal to a common electrode of the touch screen, be switched on in response to the second control signal to transmit a first compensation voltage signal to the common electrode, and be switched on in response to the third control signal to transmit a second compensation voltage signal to the common electrode;

the switch circuit comprises a first switch unit, a second switch unit, and a third switch unit, wherein the first switch unit is configured to be switched on under control of the first control signal to transmit the common voltage signal to the common electrode, the second switch unit is configured to be switched on under control of the second control signal to transmit the first compensation voltage signal to the common electrode, and the third switch unit is configured to be switched on under control of the third control signal to transmit the second compensation voltage signal to the common electrode; and when any one of the first switch unit corresponding to the first control signal, the second switch unit corresponding to the second control signal, and the third switch unit corresponding to the third control signal is switched on, the other two are switched off; and the logic circuit comprises a first processing module, wherein the first processing module comprises a first inverter circuit and a first AND gate circuit, and wherein the first inverter circuit has an input terminal configured to receive the enable signal and an output terminal electrically coupled with a first terminal of the first AND gate circuit, and the first AND gate circuit has a second terminal configured to receive the timing signal and an output terminal configured to output the first selection signal to the selection circuit.

14. The electronic device of claim 13, wherein the logic circuit comprises a second processing module, wherein the second processing module comprises a second inverter circuit, and wherein the second inverter circuit has an input terminal configured to receive the enable signal and an output terminal configured to output the second selection signal to the selection circuit.

* * * * *